US010295980B2

(12) United States Patent
Schlarb (10) Patent No.: US 10,295,980 B2
(45) Date of Patent: May 21, 2019

(54) AUTOMATION DEVICE PROCESSOR AND METHOD FOR OPERATING THE AUTOMATION DEVICE

(71) Applicant: Siemens Aktiengesellschaft, Munich (DE)

(72) Inventor: Eberhard Schlarb, Gundelfingen (DE)

(73) Assignee: Siemens Aktiengesellschaft, Munich (DE)

( * ) Notice: Subject to any disclaimer, the term of this patent is extended or adjusted under 35 U.S.C. 154(b) by 227 days.

(21) Appl. No.: 15/301,666

(22) PCT Filed: Mar. 26, 2015

(86) PCT No.: PCT/EP2015/056523
§ 371 (c)(1),
(2) Date: Oct. 3, 2016

(87) PCT Pub. No.: WO2015/150210
PCT Pub. Date: Oct. 8, 2015

(65) Prior Publication Data
US 2017/0185060 A1    Jun. 29, 2017

(30) Foreign Application Priority Data
Apr. 4, 2014 (DE) .............. 10 2014 206 607

(51) Int. Cl.
G05B 19/00 (2006.01)
G05B 19/042 (2006.01)
(Continued)

(52) U.S. Cl.
CPC .......... G05B 19/0426 (2013.01); G06F 8/36 (2013.01); G06F 8/441 (2013.01); *G05B 2219/23189* (2013.01); *G06F 8/30* (2013.01)

(58) Field of Classification Search
CPC ... G06F 8/441; G06F 8/30; G06F 8/36; G06F 8/41; G05B 19/0426; G05B 2219/23189; G05B 19/00
See application file for complete search history.

(56) References Cited

U.S. PATENT DOCUMENTS 5,978,897 A    11/1999  Nakagawa
6,862,730 B1 *  3/2005  Gorti ................. G06F 8/441
                                              712/228
(Continued)

FOREIGN PATENT DOCUMENTS

CN    1382280    11/2002
CN    101334806  12/2008
(Continued)

OTHER PUBLICATIONS

Office Action dated Jun. 5, 2018 which issued in the corresponding Chinese Patent Application No. 201580017432.6.
(Continued)

Primary Examiner — Christopher E. Everett
(74) Attorney, Agent, or Firm — Cozen O'Connor (57) ABSTRACT

An apparatus, method for operating an automation device which includes a processor for directly executing function modules, where a function module selected as a component of an automation solution via a development environment, is converted into a code block via the development environment, where the code block includes a type identifier corresponding to the type of the particular function module, where inputs and outputs of the particular function module are mapped to simultaneously usable processor registers in the code block, a plurality of code blocks is processed by reading-in a particular code block by the processor and subsequently executing the code block to execute the automation solution, and where execution of the code block includes selecting a function unit from a plurality of function (Continued)

units based on the type identifier of the code block and activation of the selected function unit with the processor registers specified in the code block.

9 Claims, 4 Drawing Sheets

(51) Int. Cl.
*G06F 8/36* (2018.01)
*G06F 8/41* (2018.01)
*G06F 8/30* (2018.01)

(56) References Cited

U.S. PATENT DOCUMENTS

| | | |
|---|---|---|
| 7,093,224 B2 | 8/2006 | Wheeler et al. |
| 2002/0099455 A1 | 7/2002 | Ward |
| 2003/0046649 A1 | 3/2003 | Wheeler et al. |
| 2003/0204386 A1 | 10/2003 | Colon-Bonet et al. |
| 2008/0009956 A1* | 1/2008 | Pouchak ............ G05B 19/0426 700/11 |
| 2008/0010049 A1* | 1/2008 | Pouchak ............ G05B 19/0426 703/14 |
| 2008/0016493 A1* | 1/2008 | Pouchak ............ G05B 19/0426 717/109 |
| 2009/0007058 A1 | 1/2009 | Dharmagadda |
| 2009/0055565 A1 | 2/2009 | Latta |

FOREIGN PATENT DOCUMENTS

| | | |
|---|---|---|
| DE | 4318317 A1 | 12/1993 |
| GB | 305054 | 1/1929 |

OTHER PUBLICATIONS

H. Berger, "Automatisieren mit STEP 7 in KIP und FUP"; Siemens SIMATIC S7-300/400 Programm; 5. Edition; pp. 120-121; ISBN: 978-3-89578-296-1; 2008.

\* cited by examiner

AUTOMATION DEVICE PROCESSOR AND METHOD FOR OPERATING THE AUTOMATION DEVICE

CROSS-REFERENCE TO RELATED APPLICATIONS

This is a U.S. national stage of application No. PCT/EP2015/056523 filed 26 Mar. 2015. Priority is claimed on German Application No. 10 2014 206 607.7 filed 4 Apr. 2014, the content of which is incorporated herein by reference in its entirety.

BACKGROUND OF THE INVENTION

1. Field of the Invention

The invention relates to a method for operating an automation device, a processor for use in the method and an automation device operating in accordance with the method.

2. Description of the Related Art

Generally, automation devices and methods for the operation thereof are known. In the description which follows, the term "automation device" comprises all devices, facilities or systems, in other words, for instance, automation computers in the form of programmable logic controllers, process computers or (industrial) computers, as well as process control systems (control technology systems), such as are or can be used to control, regulate and/or monitor technological processes in order to transform or transport material, energy or information for instance, where energy is expended or converted in particular by way of suitable technical facilities, such as sensors or actuators.

Automation computers are used particularly within the scope of process control systems, the function of which is defined by way of a project engineering system, frequently also referred to as a development environment (engineering system), by graphically linking standard modules (controller, computing and logic functions). The entirety of the functions planned in this way is referred to below as an automation solution and, in order to automate a respective technical process, is loaded into the automation computers or the automation computers provided therefor and functioning as an automation device and is executed there cyclically.

Essentially two methods were previously used here. In the first method, hereinafter referred to in brief as an interpreter solution, each planned function is converted into a sequence list, which lists all the module functions contained therein in their processing sequence and describes the dataflow between the individual functions and their parameterization. This sequence list is interpreted in the automation computer.

In the second method, hereinafter referred to in brief as a compiler solution, each planned function is converted directly by a translation process into executable machine code, which is then executed by the processor of the automation computer.

With the interpreter solution, plans can be changed more flexibly and rapidly and no target system-specific compiler is required. Higher execution speeds are achieved with the compiler solution, because an interpretation plane is omitted.

With both the interpreter solution and the compiler solution, a plurality of processor commands must each be executed to execute an individual module function. The number of processor commands to be executed is at its highest with the interpreter solution, because with the compiler solution, the number of required processor commands is reduced on account of the interposed translation step.

SUMMARY OF THE INVENTION

It is object of the present invention to provide a further method for operating an automation device when executing previously planned functions and an automation device operating in accordance with the method, in particular a method with which the number of processor commands to be executed is also significantly reduced in comparison with the conventional compiler solution.

This and other objects and advantages are achieved in accordance with the invention by a method for operating an automation device, a processor and an automation device having a processor for directly executing function modules described with additional details further below. The method is executed when an automation solution is created. With the method, each function module selected as a component of an automation solution via a development environment is automatically converted into one particular code block by the development environment. The code block comprises a unique type identifier corresponding to the type of the respective function module. The type identifier comprising the code block therefore specifies the type of the underlying function module. Inputs and outputs of the respective function module are automatically mapped to simultaneously useable processor registers of the processor in the code block by the development environment. To this end, the processor comprises a plurality of processor registers. With a first realization of such a processor, 1000 binary registers and 250 floating point registers were implemented as processor registers for instance. In order to execute the automation solution, a plurality of code blocks is processed by the reading-in of one particular code block by the processor and by subsequently executing the code block via the processor. The execution of one particular code block comprises a processor-internal selection of a function unit, which runs automatically based on the type identifier of the particular code block, from a plurality of function units comprised by the processor and by activation of the selected function unit with the processor registers specified in the code block.

The inventive processor used in the method for directly executing function modules used in the specification of an automation solution includes, on the one hand, a plurality of processor registers, such as a number of processor registers in the order of magnitude mentioned by way of the example described above, and a plurality of function units for executing different types of function modules. The contents of the processor registers are processor-internal and can be assigned automatically to one particular function unit via a multiplexer included in the processor.

It is also an object of the invention to provide an automation device for achieving the afore-cited object, where the automation device is configured to execute the method described here and below in accordance with the invention. A processor with further details below functions as a device for executing the method in accordance with the invention.

It is also an object to provide a system having at least one automation device of this type and a development environment executed using software, by which a planned automation solution is converted into a form that can be processed by the processor. The functionality of the development environment that is required for this purpose is likewise implemented using software. In this regard, the invention is also directed to a computer program with program code instructions that can be executed by a computer and, on the other hand, a storage medium having such a computer program, i.e., a computer program product with program code instructions, and also an automation device, such as an automation device in the form of what is known as a programming device, in the memory of which such a computer program is or can be loaded as a way to implement the method and its embodiments.

The advantage of the invention consists in the interpretation layers and translation processes required to process the planned automation function being eliminated in comparison with the conventional method outlined in the introduction, by a processor being defined, which is able to execute the selected form of representation of a sequence list directly as list of processor commands.

In one embodiment of the method, when a function module selected as a component of an automation solution is converted into one particular code block, the following steps are automatically executed by the development environment used when creating the automation solution. On the one hand, a unique type identifier is assigned to the respective code block based on the underlying function module, so that the code block comprises an automatically interpretable item of information about the type of the underlying function module. On the other hand, a referencing of individual, simultaneously useable processor registers of the processor is assigned to the respective code block. In this way, the inputs and outputs of the underlying function module are mapped onto particular individual processor registers, where the development environment automatically manages the available processor registers and does not repeatedly use an already used processor register (apart from a further exception described below) in the conversion of a function module into a code block.

In another embodiment of the method, when a code block is executed the contents of the processor registers specified in the code block are loaded via a multiplexer included in the processor into individual batteries (battery registers) assigned to a function unit of the processor.

In one embodiment of a processor suited to executing such a method, in which the contents of the processor registers can be assigned to one particular function unit the multiplexer, the processor has a plurality of batteries assigned to each function unit. The contents of the processor registers are assigned to one particular function unit via the multiplexer, by virtue of the content of the processor registers being loadable into one particular battery assigned to the function unit via the multiplexer.

The batteries thus function as it were as interfaces between precisely one function unit and the processor registers, and a plurality of batteries is assigned to each function unit. With a first realization of such a processor, 32 batteries for binary data and 16 batteries for floating point data were implemented, for instance, for each function unit. After loading the contents of the processor registers into the batteries of the respective function unit, the function unit can be activated. The function unit then executes the respective code block and thus the underlying function module.

In a further embodiment of the method, the code blocks generated by the development environment on based a particular underlying function module are combined in a sequence list and using the processor this sequence list is executed cyclically, by virtue of one particular code block being processed successively and the cyclical execution of the sequence list restarting with the processing of the first code block at the end of the sequence list. By combining the code blocks in a sequence list and cyclically executing them, the form of an automation program proposed here with program commands, i.e., the code blocks, which can be executed directly by the processor and represent one particular function module, is mapped onto a conventional structure of automation programs, which likewise comprise a cyclically executed sequence list.

It is a further object of the invention to provide a system comprising a development environment and an automation device of the type described here and below. The development environment is a computer program or a collection of computer programs for creating an automation solution. The development environment also comprises program code instructions comprising a computer program in order to automatically convert a function module selected as a component of an automation solution into one particular code block. As a result of such an automatic conversion, a resulting code block comprises a unique type identifier based on the underlying function module and a referencing of individual, simultaneously useable processor registers of the processor of the automation device. A code block is generated in this way for each function module of the automation solution and the resulting code block or the resulting code blocks are executed by the automation device via the specific processor of the automation device described here and below.

Other objects and features of the present invention will become apparent from the following detailed description considered in conjunction with the accompanying drawings. it is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

An exemplary embodiment of the invention is explained in more detail below on the basis of the drawing. Objects or elements which correspond to one another are provided with the same reference characters in all the figures, in which.

DETAILED DESCRIPTION OF THE EXEMPLARY EMBODIMENTS

Figure 1:
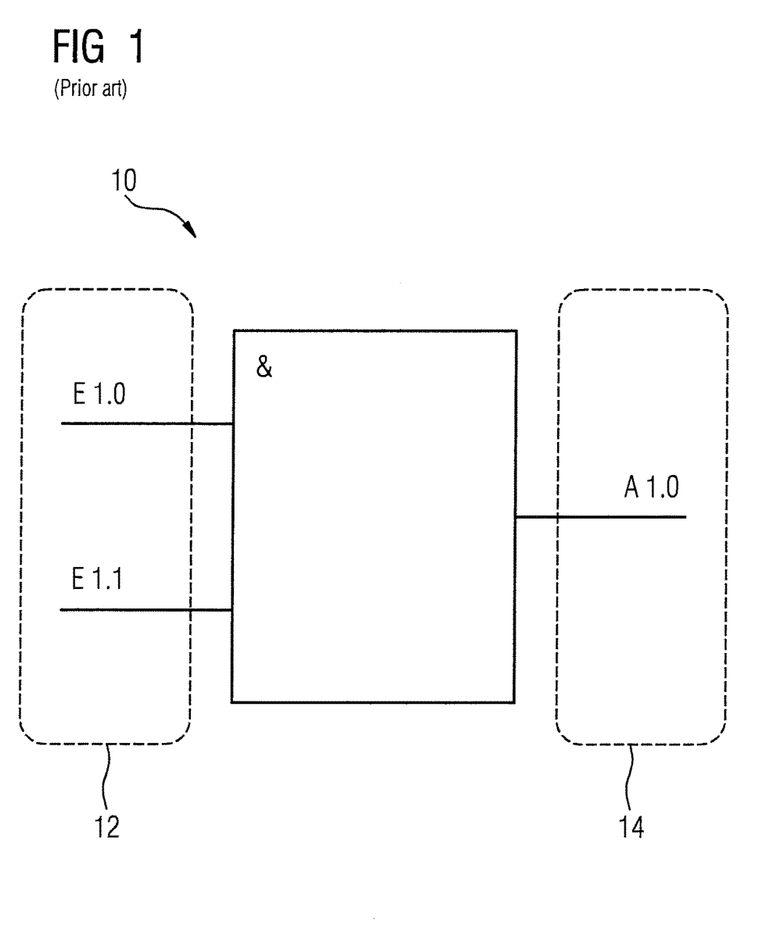
FIG. 1 shows an AND gate as an exemplary (function) module that can be used to create an automation solution in accordance with the prior art.

An automation solution, i.e., a computer program or a collection of computer programs for controlling and/or monitoring a technical process, typically comprises a plurality of function modules 10, hereinafter referred to in brief as modules 10, and the representation in FIG. 1 shows an AND gate as a particularly simple example of a module 10 of this type. Such an AND gate comprises a plurality of inputs 12, here specified symbolically as "E1.0" and "E1.1", and at least one output 14, symbolically referred to as "A1.0". Just like such an AND gate, each module 10 considered below also comprises at least one input 12 and at least one output 14.

Figure 4:
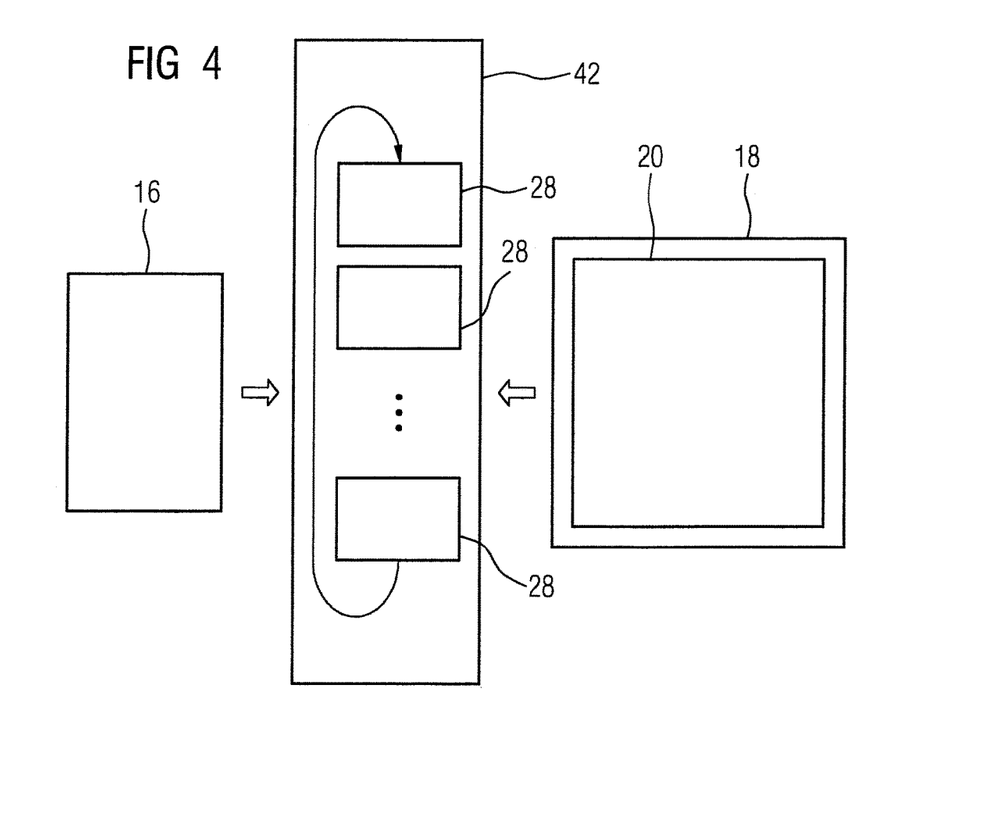
FIG. 4 shows an overview display with the processor of FIG. 2 and a sequence list produced in accordance with a planning of an automation solution, the contents of which are executed successively via the processor.

A planning of an automation solution and thus also the use of such modules 10 occurs in a manner fundamentally known per se using software typically referred to as a development environment 16 (FIG. 4). Within the scope of the planning of an automation solution, a plurality of modules 10 are typically used and linked to one another. In the interest of easy readability of the description below, but without renunciation of a further-reaching generality, this is continued as far as possible using the example of a module 10 in the form of an AND gate, as shown in FIG. 1.

Figure 2:
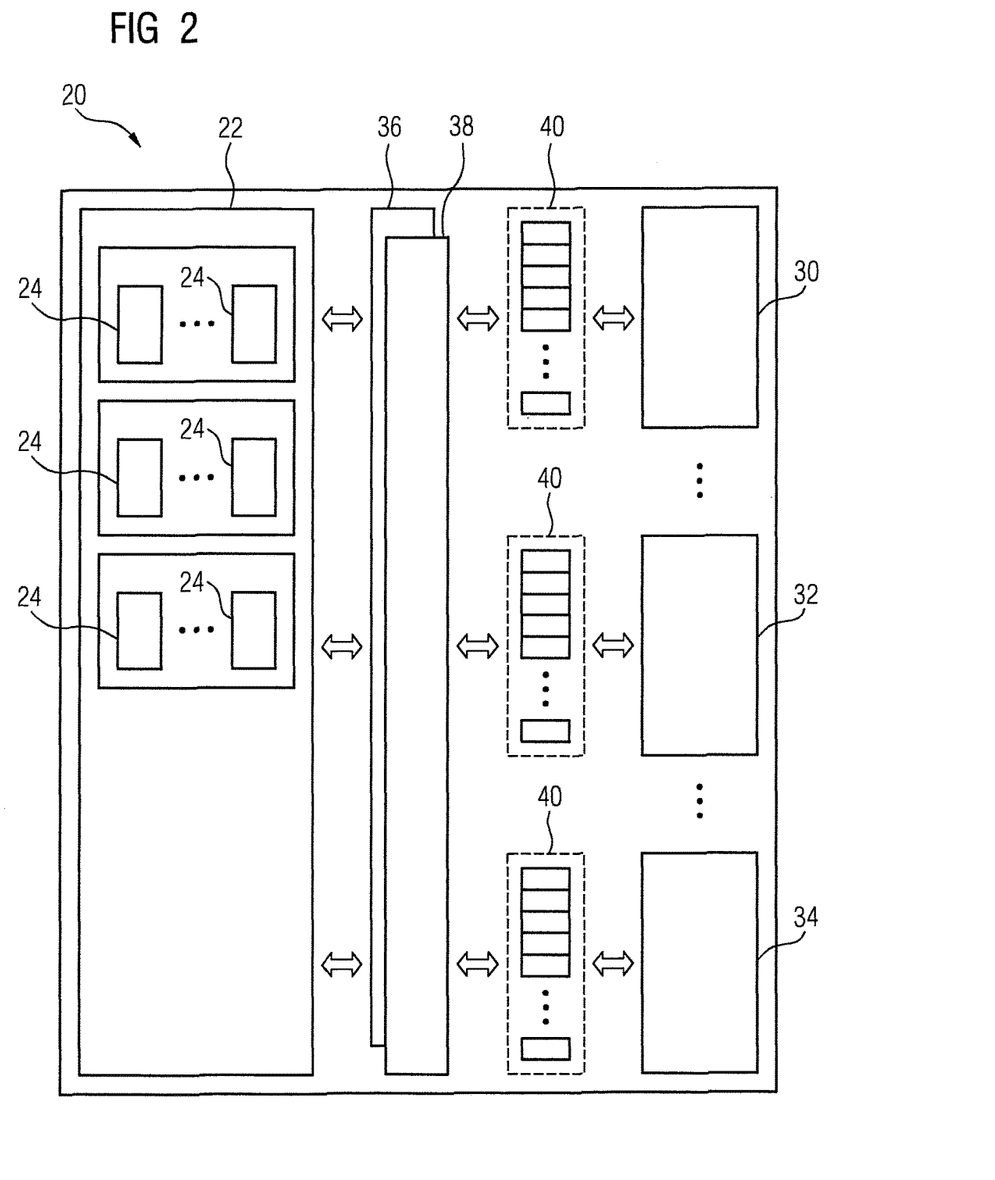
FIG. 2 shows a schematically simplified representation of a processor provided to process such modules in accordance with the invention.

When planning a module 10, the type of module 10 (module type) and the respective number of inputs 12 and outputs 14 are fixed. Furthermore, the processor 20 (FIG. 2) provided to execute the automation solution is fixed, i.e., the processor 20 of the automation device 18 determined to control and/or monitor the respective technical process. Such a processor 20 comprises a plurality of processor registers 24 in a processor register storage area 22, where the individual processor registers 24 can be assigned to different categories.

Figure 3:
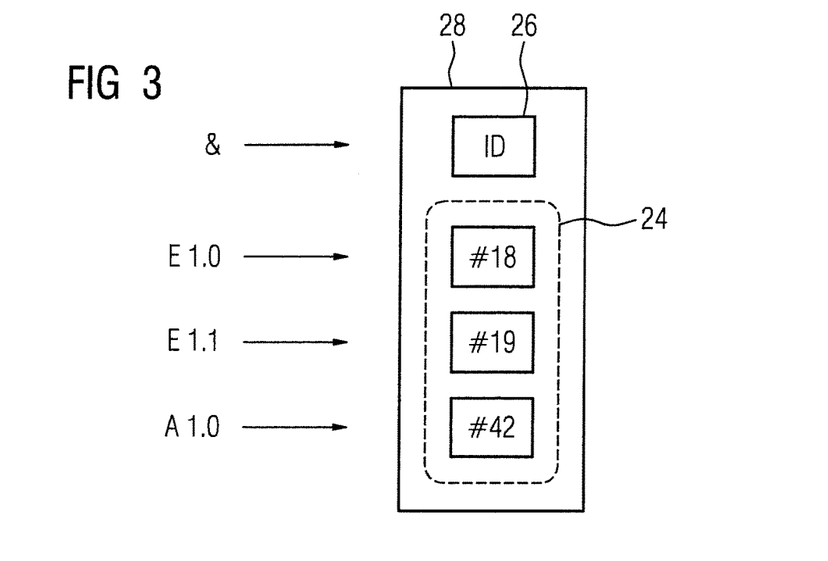
FIG. 3 shows a representation for explaining a conversion of a planned form of a module into a form which can be executed by the processor in accordance with the invention.

Aside from the exception explained below, whenever a module 10 is used within the scope of planning an automation solution, a processor register 24 is uniquely assigned to each new input 12 used there, and a processor register 24 is likewise uniquely assigned to each new output 14 used there. This assignment occurs via a software functionality within the development environment 16 and for illustration purposes FIG. 3 shows in a tabular representation the inputs and outputs 12, 14 comprised by the module 10 according to FIG. 1 and their assignment to one particular processor register 24, where the assigned processor registers 24 are uniquely identified by an address or the like. In the representation in FIG. 3, this is shown symbolically with a number that is unique within the entirety of the processor registers 24 and thus functions as an address. Furthermore, the module type of the respective module 10 is converted into a unique identifier referred to below as type identifier 26, here shown symbolically as "ID".

An automation solution with a plurality of modules 10 used therein is converted in this way into a number of code blocks 28 corresponding to the number of modules 10 used and each code block 28 represents a command that can be executed directly by the processor 20.

The afore-mentioned exception consists in individual modules 10 also being able to be supplied at their inputs with a constant, such as a module for implementing a multiplication, which is supplied with a fixed multiplication factor at one of its inputs. With such an input parameter, the respective numerical value is entered directly into the code block 28. Instead of an address/reference, the code block 28 then comprises the respective constant as a numerical value. Here, the individual data comprised by a code block 28 is encoded such that directly specified numerical values and addresses/references can be distinguished.

To directly realize the functionality of the respective module 10 via the processor 20, this comprises a separate function unit 30, 32, 34 (FIG. 2) for each module type. Each function unit 30, 32, 34 comprises at least one particular logical or arithmetic operation in hard-wired form. In one embodiment of a code block 28 referring back to a module 10 in the form of an AND gate, a first function unit 30 of the processor 20 becomes active for instance. In one embodiment of a code block 28 referring back to a module 10 in the form of a counter or the like, a second function unit 32 becomes active, for instance, and in one embodiment of a code block 28 referring back to a module 10 in the form of an adder, a third function unit 34 becomes active, for instance, and so on.

In principle, it is also possible here for a function unit 30, 32, 34 to use one or more standard operations (not shown), which are realized on the processor 20 in the same way as a function unit 30, 32, 34, so that in this way with complex functionalities such standard operations have a number of function units 30, 32, 34 available. The processor 20 therefore also comprises, if required, in addition to the function units 30, 32, 34, logical and/or arithmetical standard operations in hard-wired form.

In one embodiment of a processor command corresponding to a code block 28, the respective function unit 30, 32, 34 is supplied via at least one multiplexer 36 included in the processor 20 with the inputs and outputs 12, 14 provided in accordance with the planning, i.e., the processor registers 24 (see, e.g., FIG. 3) assigned and uniquely referred to in the respective code block 28. For this purpose, a plurality of storage cells (battery registers), referred to here in brief and in line with the usual terminology as batteries 40, are assigned to each function unit 30, 32, 34. The batteries 40 function as an intermediate layer between the processor registers 24 and the function units 30, 32, 34, i.e., similar to local variables of a computer program applied in a stack.

The data specified in the code block 28, in other words either the contents of the processor registers 24 referenced there or the constants entered there, are loaded into the batteries 40 of the respective function unit 30, 32, 34 via the multiplexer 36. Therefore, all data required to "calculate" the underlying module 10 is directly available and the execution of the module 10 is reduced to one processor cycle. The output value determined in the process is written into the battery 40 and via the multiplexer 36 or a further multiplexer 38 is written back into the processor register 24 specified in the code block 28, i.e., the processor register 24 that was selected to represent the output 14 with the original implementation of the underlying module 10 (cf FIG. 3).

In the embodiment of the functionality of the module 10 of FIG. 1, after supplying the batteries 40 with the corresponding contents according to code block 28 and the subsequent activation of the respective function unit 30, 32, 34 of the processor 20, the result of the execution (here the result of the AND link) is directly available in the processor register 24 assigned to the respective output 14.

If an input 12 of a module 10 (downstream module) following a module 10 in the signal flow direction is connected to an output 14 of a module 10 (upstream module) preceding in the signal flow direction, within the scope of implementation using the development environment 16, the input 12 of the downstream module 10 obtains the address, possibly the data type-specific address, of the output 14 of the upstream module 10. In the example of the AND gate with "A1.0=E1.0 & E1.1" shown in FIG. 1 and a further AND gate (not shown) with "A5.2=A1.0 & E8.0", this means that the input 12 "A1.0" of the downstream module 10 contains the address of the output "A1.0" of the upstream module 10 shown in FIG. 1, here therefore the address "#42" (FIG. 3) for instance.

In a special embodiment of the processor 20, different processor registers 24 are available and for these are grouped in a data type-specific manner. With such a data type-specific grouping, the processor registers 24 differ, such as with respect to their bit width. Accordingly, for instance, binary, i.e., 1-bit width processor registers 24 and processor registers 24 corresponding to conventional data types (byte—8-bit; word - 16-bit; real,longint—32/64-bit, etc.) are available.

The representation in FIG. 4 shows the previously explained details in summarized form. A development environment 16 is used to create an automation solution. The creation of the automation solution comprises use of a plurality of modules 10. Each module 10 is converted into a code block 28 via a software functionality within the development environment 16. The automation solution is then a sequence list 42 with one particular code block 28 for each module 10 used. The sequence list 42 is executed cyclically. Here, the processor 20 of the automation device 18 determined to execute the automation solution successively accesses one particular code block 28 and executes this in the manner described above. Here, each code block 28 corresponds to a processor command.

When the processor command is read in, the multiplexer 36 or multiplexers 36, 38 is/are connected by the type identifier 26 at the start of the code block 28 such that the processor registers 24 referenced in the code block 28 or the data specified in the code block 28 are connected to the type-specific (module type-specific) operational logic of the function unit 30-34 of the processor 20 selected based on the type identifier 26.

Individual salient aspects of the description submitted here can be briefly summarized as follows: a method for operating an automation device 18, which comprises a processor 20 for directly executing function modules 10, and an apparatus suited to use in the method and operating in accordance with the method, i.e., a processor or an automation device 18 with such a processor 20, are specified, where a function module 10 selected via a development environment 16 as a component of an automation solution is converted into one particular code block 28, where the code block 28 comprises a type identifier 26 corresponding to the type of the particular function module 10, wherein inputs and outputs 12, 14 of the particular function module 10 are mapped to simultaneously useable processor registers 24 in the code block 28, where in order to execute the automation solution, a plurality of code blocks 28 is processed by the reading-in of one particular code block 28 by the processor 20 and a subsequent execution of the code block 28, and where the execution of the code block 28 comprises selecting a function unit 30, 32, 34 from a plurality of function units 30, 32, 34 comprised by the processor 30 based on the type identifier 26 of the code block 28 and activating the selected function unit 30, 32, 34 with the processor registers 24 specified in the code block 28.

The advantage of the approach described here consists above all in that an execution of a module function has hitherto comprised the processing of a plurality of processor commands on a target system-specific standard processor, whereas a module function is now reduced to one processor command. This combines the advantages of the two previous approaches outlined in the introduction. As with an interpreter solution, no specific compiler is required in the approach shown here. Furthermore, the flexibility of the approach and the possibility of performing changes is comparable with the previous interpreter solution. As with the compiler solution, a significantly increased execution speed, compared with the interpreter solution, is produced. In fact, the execution speed which can be achieved with the approach presented here is in part even significantly higher than the execution speed which can be achieved with the compiler solution, because a module function is reduced to a single processor command. Finally, a qualification for what is known as fail-safe use would be considerably cheaper, because an underlying operating system, a compiler, software which implements the modules, and a standard processor no longer have to be taken into consideration, such as in advance certification, by which the suitability of the afore-cited components for the fail-safe use is established and documented.

With a practical test of the approach presented here in the form of a VHDL prototype implementation of the processor 20 on the FPGA of an assembly (I/O assembly) of an automation device 18, the execution times of the processor 20 were compared with those of an interpreter written in the language C for a standard processor for the same sequence list 42. Here, an increase in speed by a factor of the order of magnitude 100 was observed with the same clock frequency. The approach presented here is particularly suitable for use in I/O assemblies, which have an FPGA module, because the processor 20 can be implemented as a VHDL module and is thus easily portable into this environment.

Figure 5:
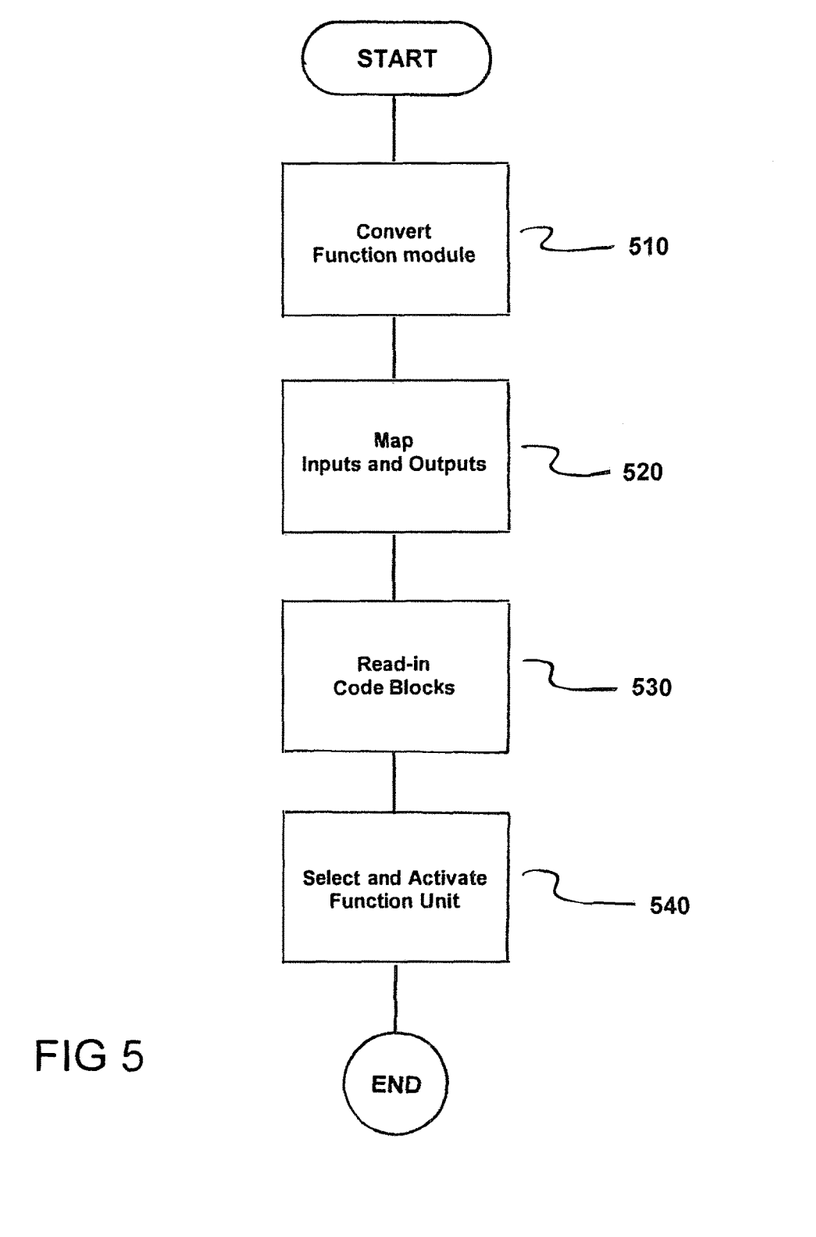
FIG. 5 is a flowchart of the method in accordance with the invention.

FIG. 5 is a flowchart of a method for operating an automation device 18 comprising a processor 20 for directly executing function modules 10. The method comprises converting a respective function module 10 selected as a component of an automation solution via a development environment 16 into a particular code block 28 via the development environment 16, as indicated in step 510. In accordance with the invention, the code block 28 comprises a type identifier 26 corresponding to a type of the respective function module 10.

Next, inputs and outputs 12, 14 of the respective function module 10 are mapped to simultaneously useable processor registers 24 in the code block 28, as indicated in step 520.

A plurality of code blocks 28 are now read-in to process a particular code block 28 by the processor 20 and the code block 28 is subsequently executed to execute the automation solution, as indicated in step 530.

Next, a function unit 30, 32, 34 is selected from a plurality of function units 30, 32, 34 within the processor 20 based on the type identifier 26 of the code block 28 and the selected function unit 30, 32, 34 with the processor registers 24 specified in the code block 28 is activated to execute the code block 28, as indicated in step 540.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those element steps which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for operating an automation device comprising a processor for directly executing function modules, the method comprising:

converting a respective function module selected as a component of an automation solution via a development environment into a particular code block via the development environment, the particular code block comprising a type identifier corresponding to a type of the respective function module;

mapping inputs and outputs of the respective function module to simultaneously useable processor registers in the particular code block;

reading-in a plurality of code blocks to process the particular code block by the processor and subsequently executing the particular code block to execute the automation solution; and selecting a function unit from a plurality of function units within the processor based on the type identifier of the particular code block and activating the selected function unit with the processor registers specified in the particular code block to execute the particular code block;

wherein contents of processor registers specified in the particular code block are loaded into individual batteries assigned to a function unit of the processor via a first multiplexer of a plurality of multiplexers comprised by the processor when executing the particular code block.

2. The method as claimed in claim 1, further comprising:
assigning a unique type identifier and referencing individual, simultaneously useable processor registers of the processor the respective code block via the development environment based on an underlying function module when converting a function module selected as a component of an automation solution into the particular code block.

3. The method as claimed in claim 2, wherein code blocks generated via the development environment based on a particular underlying function module are summarized in a sequence list; and wherein the sequence list is cyclically executed via the processor by one particular code block being processed successively.

4. The method as claimed in claim 1, wherein code blocks generated via the development environment based on a particular underlying function module are summarized in a sequence list; and wherein the sequence list is cyclically executed via the processor by one particular code block being processed successively.

5. A processor for directly executing different function modules utilized to specify an automation solution, the processor comprising:

a plurality of processor registers;

at least one particular function unit; and a plurality of multiplexers, said contents of the plurality of processor registers being assigned to the at least one particular function unit via a first multiplexer of the plurality of multiplexers;

wherein as an assignment of the contents of the plurality of processor registers to the at least one particular function unit via the first multiplexer of the plurality of multiplexers, the contents of the plurality of processor registers is loadable into one particular battery assigned to the at least one particular function unit.

6. The processor as claimed in claim 5, further comprising:
a plurality of batteries assigned to each function unit.

7. An automation device having a processor as claimed in claim 6.

8. An automation device having a processor as claimed in claim 5.

9. A system having:

a development environment; and an automation device including a processor for directly executing different function modules utilized to specify an automation solution, the processor comprising:

a plurality of processor registers;

at least one particular function unit; and a plurality of multiplexers, said contents of the plurality of processor registers being assigned to the at least one particular function unit via a first multiplexer of the plurality of multiplexers;

wherein as an assignment of the contents of the plurality of processor registers to the at least one particular function unit via the first multiplexer of the plurality of multiplexers, the contents of the processor registers is loadable into one particular battery assigned to the at least one particular function unit;

wherein the development environment comprises program code instructions for automatically converting a function module selected as a component of an automation solution into one particular code block; and wherein each code block comprises a unique type identifier based on an underlying function module and a referencing of individual, simultaneously useable processor registers of the processor of the automation device.

* * * * *